Feb. 8, 1944. R. PUDELKO 2,341,332
SPRING MOTOR AND FRICTION COUPLING
Filed Feb. 14, 1941
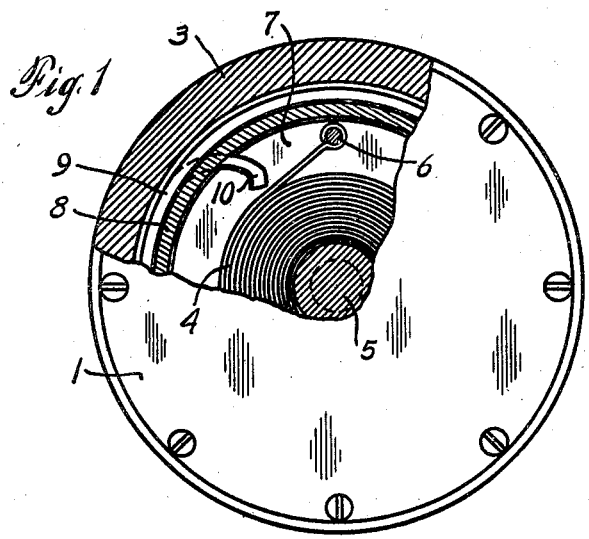
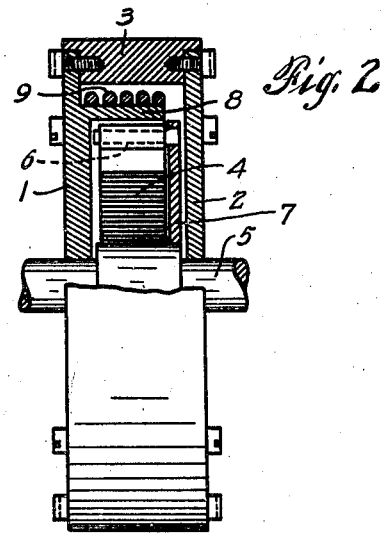
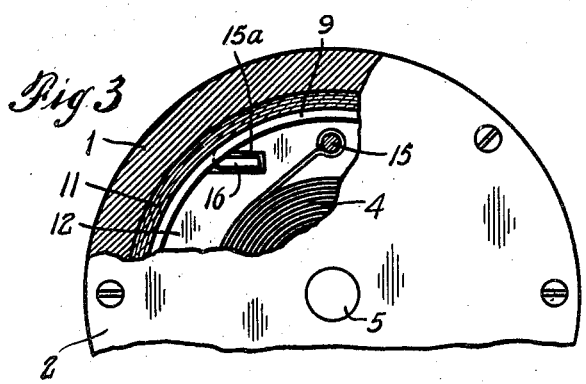
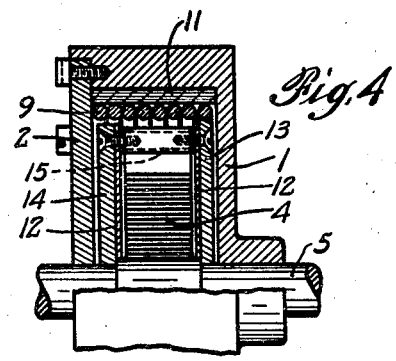
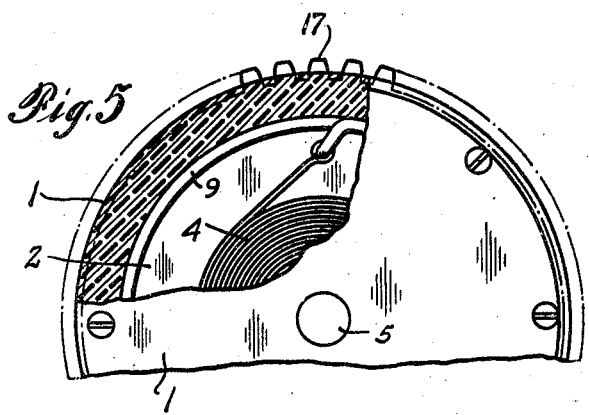
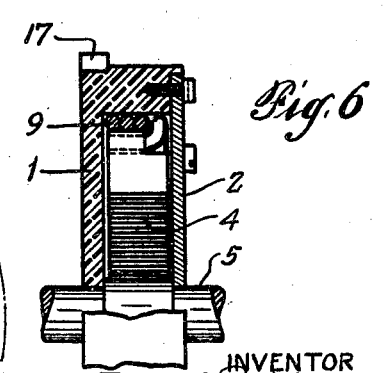
INVENTOR
Richard Pudelko
BY
Morgan, Finnegan & Durham
ATTORNEYS Patented Feb. 8, 1944

2,341,332

UNITED STATES PATENT OFFICE 2,341,332

SPRING MOTOR AND FRICTION COUPLING

Richard Pudelko, Zug, Switzerland, assignor to Landis & Gyr, A.-G., a body corporate of Switzerland Application February 14, 1941, Serial No. 378,952
In Switzerland February 15, 1940

4 Claims. (Cl. 185—43)

The present invention relates to a novel and improved combined spring motor and friction coupling.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates three embodiments of the invention, and together with the description, serve to explain the principles of the invention.

Of the drawing:

Figures 1 and 2 show a typical and illustrative embodiment of the present invention;

Figures 3 and 4 a modified embodiment of the present invention; and

Figures 5 and 6 a further modified embodiment of the invention, each of these embodiments being shown in side and front view, with certain parts in section.

The present invention has for its object the provision of a novel and improved combined spring motor and friction coupling of compact, simple construction which is reliable in its operation. A further object is the provision of an improved friction coupled spring motor which is of greater than usual efficiency and avoids the defects of the usual prior constructions.

It has long been customary to fit friction couplings in spring housings such as are used for the accumulation and giving up of energy, for example in clocks, clockwork mechanisms and the like, in order to avoid overwinding the spring or to permit a workable slipping of the spring in the case of synchronous clocks, where the spring only acts as a reserve of energy should an interruption take place of the current in the mains.

These friction couplings usually comprise a complete unit which includes an independent abutment surface on the counter-surface of the spring housing and there is consequently the drawback that the slipping cannot be controlled with any certainty and, under certain circumstances, an undesirable amount of slipping takes place, having as a consequence an excessive unwinding of the spring immediately after it has been wound up. Thus the loss of a considerable part of the spring energy takes place. This arises from the fact that once the clutch has started to slip, it continues slipping until the spring has almost entirely become unwound.

The present invention obviates this defect and according to it the friction coupling is formed by a layer of convolutions of a spring wire directly coupled to one end of the spring. Preferably the turns of the spring wire can rest against an artificial substance, such as pressed body of artificial resin, hard fabric or the like. In this case at least the cylindrical part of the housing against which the convolutions of wire rest, may consist of artificial substance or the metallic spring housing may have an inset or bush of artificial substance.

It will be understood that the foregoing general description and the following detailed description as well, are exemplary and explanatory of the invention but are not restrictive thereof.

According to the embodiment of Figures 1 and 2, 1 and 2 are the walls of a spring housing and these parts are spaced with respect to each other by an annular spacing member 3 to which they are secured by screws. A spring 4, is connected in the usual manner at its inner end to a shaft 5 extending through the spring housing. The outer end of the spring 4 is formed into an eye which is fitted over a pin 6, fitted on a disc 7 freely rotatable on the shaft 5.

The wall 1 of the spring housing has a deep annular flange 8, around which is arranged a layer consisting of turns of spring wire 9. One end of this wire is bent inwards over the edge of the cylindrical flange 8 to form a hook 10 which engages in a recess in the disc 7. The hooked end 10 can be soldered in the recess.

During the winding up of the spring 4, which can take place by hand or by mechanical energy, the spring wire 9 holds the disc 7 and in consequence also the outer end of the spring 4 firmly relatively to the spring housing 1, 2, 3. When, however, the spring 4 is fully wound up and the winding-up movement is continued, the spring wire commences to slip. However, since the wire 9 is of helical form and in consequence no part of the said wire forms a closed ring upon the cylindrical flange, the braking moment immediately increases rapidly and there is prevented a slipping of the spring 4 in excess of that necessary owing to the increased tension which the continued winding-up movement produces.

According to the embodiment shown in Figures 3 and 4, the wall 1 of the spring housing is formed integrally with the annular spacing member which is provided with a bushing 11 of artificial substance such as artificial resin, hard fabric or the like, against the interior of which the turns of the spring wire 9 bear. The spring 4 is interposed between discs 12 which also consist of artificial substance and are arranged between two metallic discs 13, 14 which are connected together by bolts 15, the spring 4 being secured at its outer end to one of these bolts. The disc 13 has a recess 15a and the hook-shaped bent end 16 of the spring wire 9 is inserted therein.

On excessive tensioning of the spring 4, the spring wire 9 slips as in the first example but here the spring housing is protected from wear by the bushing of artificial substance, so that the housing itself is not worn away by means of the friction coupling. The discs 12 of artificial substance also represent protection against wear since they protect the metallic discs 13, 14 from the edges of the convolutions of the spring 4.

According to the second modified embodiment (Figures 5 and 6), the spring wire 9 bears by its turns directly against the cylindrical spacing member of the casing which is formed integrally with the wall 1. It is here assumed that the wall 1 and the cylindrical spacing member consist of artificial substance being formed, for example, of artificial resin, and teeth 17 on the spring housing, for imparting movement to, or for transmitting movement from the spring housing are themselves formed of the artificial substance. These teeth could also be formed by a metallic rim pressed into the wall 1 during manufacture.

The spring wire 9 is directly connected with the spring 4 by engaging the outer end of the spring 4, formed into a loop, with one end of the wire 9 which is bent inwards and turned at an angle.

While the friction spring may be located on the outside or on the inside of the driving spring, I prefer to locate the friction spring on the outside of the driving spring so as to give greater area for the operation of the friction spring. The spring wire 9 is preferably but not necessarily of round cross-section.

The invention in its broader aspects is not limited to the specific mechanism shown and described but departures may be made therefrom within the scope of the accompanying claims without departing from the principles of the invention and without sacrificing its chief advantages.

What I claim is:

1. A combined spring motor and spring clutch including in combination a central shaft member, a motor spring, a rotatable member to which and the shaft the spring is connected, a second rotatable member, a helical spring of several convolutions forming a spring clutch therewith, said helical spring interconnecting the first and second rotatable members.

2. A combined spring motor and spring clutch including in combination a central shaft member, a motor spring, a cylindrical drum rotatable with reference to the shaft, a spring clutch comprising a plurality of helical convolutions forming a helical spring and interconnecting the drum and motor spring.

3. A combined spring motor and friction clutch as claimed in claim 2 in which the spring clutch contacts with the inner surface of the drum and has its end directly connected to an end of the spring.

4. A combined spring motor and friction clutch as claimed in claim 2 in which the spring clutch and spring motor are directly interconnected to release the clutch on overwinding of the motor spring.

RICHARD PUDELKO.